United States Patent
Hofheinz et al.

(10) Patent No.: US 7,444,976 B2
(45) Date of Patent: Nov. 4, 2008

(54) BALANCE SHAFT FOR A MULTICYLINDER IN-LINE ENGINE

(75) Inventors: Werner Hofheinz, Denkendorf (DE);
Bernhard Jutz, Burgstetten (DE);
Timm Papenhagen, Leutenbach (DE);
Thomas Stolk, Kirchheim (DE);
Karsten Unger, Stuttgart (DE)

(73) Assignee: Daimler AG, Stuttgart (DE)

(*) Notice: Subject to any disclaimer, the term of this patent is extended or adjusted under 35 U.S.C. 154(b) by 268 days.

(21) Appl. No.: 11/526,898

(22) Filed: Sep. 22, 2006

(65) Prior Publication Data
US 2007/0062329 A1 Mar. 22, 2007

Related U.S. Application Data

(63) Continuation-in-part of application No. PCT/EP2005/002662, filed on Mar. 12, 2005.

(30) Foreign Application Priority Data
Mar. 23, 2004 (DE) .......... 10 2004 014 014

(51) Int. Cl.
*F02B 75/06* (2006.01)
*F16C 11/00* (2006.01)
(52) U.S. Cl. .................. 123/192.2; 74/604
(58) Field of Classification Search .......... 123/192.2, 123/197.4, 197.1; 74/604
See application file for complete search history.

(56) References Cited
U.S. PATENT DOCUMENTS

| | | | | |
|---|---|---|---|---|
| 4,440,123 A | * | 4/1984 | Tsai | 123/192.2 |
| 4,690,111 A | * | 9/1987 | Kohno et al. | 123/192.2 |
| 4,696,267 A | * | 9/1987 | Kohno et al. | 123/192.2 |
| 4,819,505 A | * | 4/1989 | Takubo et al. | 74/603 |
| 5,253,547 A | * | 10/1993 | Yoneyama et al. | 74/604 |
| 6,189,499 B1 | * | 2/2001 | Iwata et al. | 123/192.2 |
| 2001/0023623 A1 | * | 9/2001 | Killion | 74/603 |
| 2003/0013534 A1 | * | 1/2003 | Killion et al. | 464/180 |
| 2003/0145821 A1 | * | 8/2003 | Hashimoto et al. | 123/192.2 |
| 2004/0079316 A1 | * | 4/2004 | Lawrence | 123/192.2 |
| 2004/0177824 A1 | * | 9/2004 | Decuir | 123/192.2 |
| 2004/0250788 A1 | * | 12/2004 | Carden | 123/192.2 |
| 2005/0205043 A1 | * | 9/2005 | Schmidt et al. | 123/197.1 |

FOREIGN PATENT DOCUMENTS

| | | |
|---|---|---|
| DE | 33 14 801 | 10/1984 |
| DE | 37 05 346 | 8/1987 |
| DE | 199 47 271 | 4/2000 |

* cited by examiner

*Primary Examiner*—Noah Kamen
(74) *Attorney, Agent, or Firm*—Klaus J. Bach

(57) ABSTRACT

In a balance shaft for a multi-cylinder in-line engine with at least two imbalance weight sections and at least one bearing structure wherein the balance shaft has imbalance weight sections being arranged symmetrically relative to the bearing position and at least one of the imbalance weight sections is connected to a further shaft section at an end facing away from the bearing position, a flexible coupling element that enables a deflection of the end of the connected imbalance weight section in the direction of the resulting centrifugal forces when the balance shaft rotates is provided between the end of the at least one imbalance weight section facing away from the bearing position and the further shaft section.

9 Claims, 2 Drawing Sheets

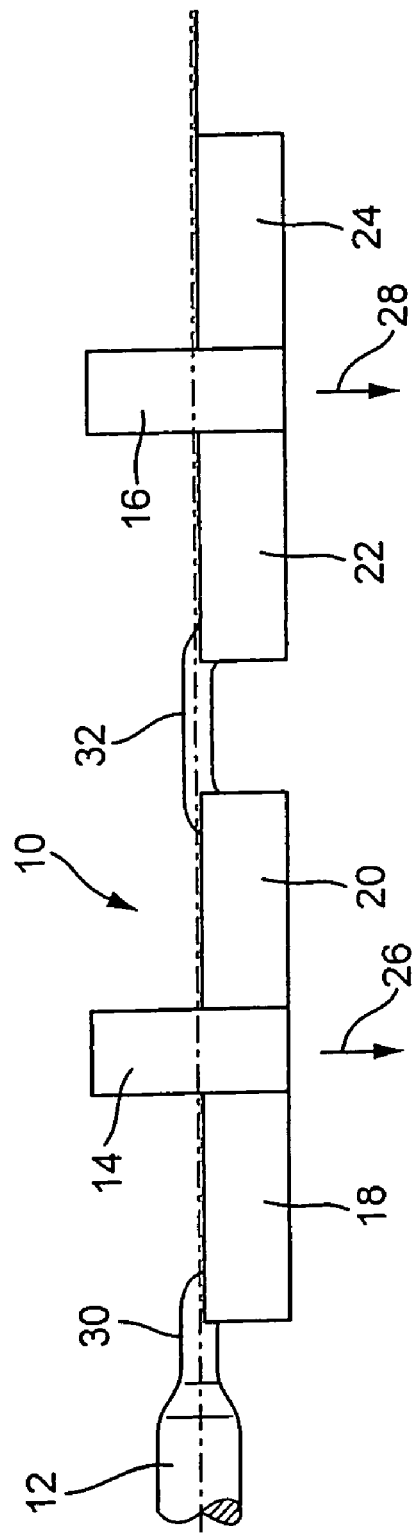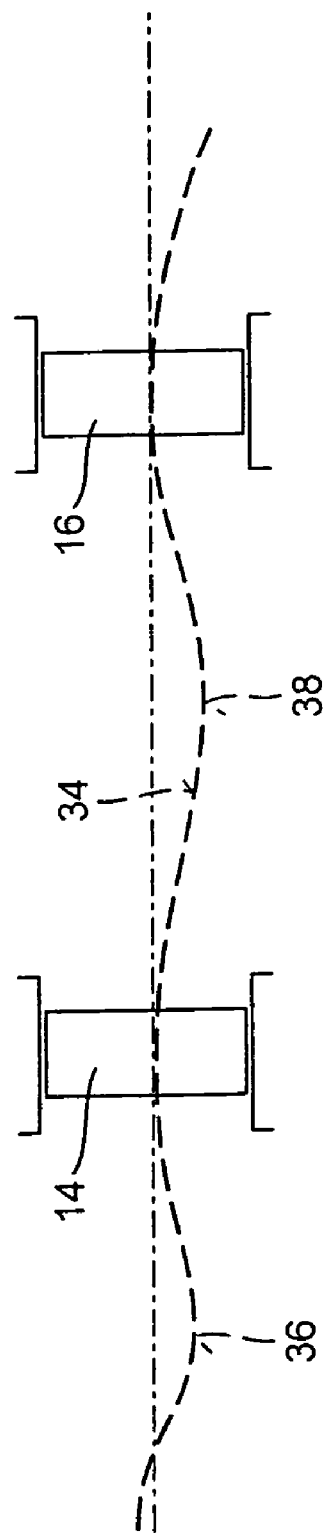

BALANCE SHAFT FOR A MULTICYLINDER IN-LINE ENGINE

This is a Continuation-In-Part Application of International application PCT/EP2005/002662 filed Mar. 12, 2005 and claiming the priority of German application 10 2004 014 014.6 filed Mar. 23, 2004.

BACKGROUND OF THE INVENTION

The invention relates to a balance shaft for a multi-cylinder, in-line engine with at least two imbalance weight sections and at least one bearing structure, with the imbalance weight sections being arranged symmetrically relative to the bearing structure and at least one of the imbalance weight sections being connected to a further shaft section at an end facing away from the bearing structure.

From German patent application DE 199 47 271 C1, a balance shaft for a multi-cylinder in-line engine is known that has two imbalance weight sections. The two imbalance weight sections are symmetrically arranged on either side of a central bearing structure. Two further bearing structure are each arranged to the right and left of the imbalance weight sections. A further shaft section extends up to a front end of the engine, is supported on a fourth bearing structure and carries a drive wheel at its free end.

The problem with balance shafts is that they deform at high speed due to the resulting centrifugal forces and are thus also bent in the area of the bearing. This can lead to tilting of the bearings of the balance shaft causing increased bearing stress. To compensate for tilting of the bearing structures, they are slightly spherical. This, however, leads to a reduced load-bearing capacity of the bearing positions. With a symmetrical arrangement of the imbalance weight sections with respect to a bearing structure the tilting of the bearing structures in operation can be reduced.

From German patent application DE 37 05 346 C2, a balance shaft for a multi-cylinder, in-line engine is known where tilting of the bearing structure in operation is to be avoided by an appropriate asymmetric design of imbalance weight sections of a single imbalance mass on the right and left of a central bearing position, with a total of two further bearing positions being arranged to the right and left of the central bearing position that are spaced at a different distance from the central bearing position. The imbalance weight section, arranged at a relatively large distance between the bearing positions, is stronger than the other imbalance weight sections in order to achieve a symmetric deformation of the shaft immediately right and left of the central bearing structure when the balance shaft is rotating.

From German patent application DE 33 14 801 C2, a further balance shaft for a multi-cylinder, in-line engine is known where imbalance weight sections are arranged symmetrically with respect to a bearing structure. A free end of the balance shaft is formed by an imbalance weight section.

It is the object of the present invention is to provide a light balance shaft with bearings which have a high load-bearing capacity.

SUMMARY OF THE INVENTION

In a balance shaft for a multi-cylinder, in-line engine with at least two imbalance weight sections and at least one bearing structure wherein the balance shaft has imbalance weight sections arranged symmetrically relative to the bearing position and at least one of the imbalance weight sections is connected to a further shaft section at an end facing away from the bearing position, a flexible coupling element, that enables a deflection of the end of the connected imbalance weight section in the direction of the resulting centrifugal forces when the balance shaft rotates, is provided between the end of the at least one imbalance weight section facing away from the bearing position and the further shaft section.

The flexible coupling elements are essentially torsionally rigid with respect to the torques about the longitudinal axis of the shaft but can be deformed by a force in the direction of the resulting centrifugal force. When the shaft rotates, the flexible coupling elements thus permit a less disturbed deflection of the imbalance weight sections compared to a conventional balance shaft. Because the imbalance weight sections are, furthermore, preferably arranged symmetrically with respect to the bearing position the balance shaft also deforms symmetrically structure to the bearing structure during rotation of the balance shaft, thus avoiding tilting of the bearing. As a result, the provision of the flexible coupling elements can deliberately influence a bend line of the shaft and especially a skewed position or tilting of the bearings can be minimized. Because no tilting of the bearings occurs, the spherical shape of the bearing surfaces provided with conventional balance shafts can be minimized. This increases the load-bearing capacity of the bearings and consequently they can be smaller. The balance shaft according to the invention can thus be light because a deformation of the shaft is deliberately permitted and thus only minimum stiffening measures, that in principle always act against an imbalance and thus lead to a disproportional increase in weight, are necessary. Furthermore, the possible smaller dimensions of the bearings results in a distinct reduction in friction. The flexible coupling elements can in this case be cylindrical. The bearing structures are preferably located between the cylinders of the internal combustion engine.

In a particular embodiment of the invention, the imbalance weight sections arranged on either side of the bearing structures are each designed and/or arranged at a distance from the bearing structures such that a superimposed tilting moment occurring during the rotation of the balance shaft on the bearing position is almost zero.

In this way, a skewed position of the shaft at the bearing structures on conventional balance shafts caused by the rotation of the imbalance mass can be fully compensated for. By independent displacement of the imbalance weight sections relative to the bearing structures and/or due to different masses of the individual imbalance weight sections, tilting moments are generated around the bearing structures that compensate one another when they are superimposed at the bearing structure. In this case, it can be seen that firstly the provision of flexible coupling elements permits the independent adjustment of the bearing skewed position because interactions between the individual imbalance weight sections or segments of the balance shaft are minimized by the coupling elements. In addition, the overall center of gravity of the balance shaft can be influenced by such measures. It is then possible to position the overall center of gravity such that it lies on a transverse axis that runs through the center of the power train of the internal combustion engine. In this way, the tilting moments that the balance shafts exert overall on the internal combustion engine can be minimized.

In a development of the invention, the flexible coupling element has a rectangular cross section when viewed in the longitudinal direction of the balance shaft, with a smaller side of the rectangular cross section extending parallel to the centrifugal forces resulting when the shaft rotates.

The desired characteristic of the flexible coupling elements can be achieved in this way by means of a comparatively simple geometry. In particular, a coupling element of this kind is comparatively stiff with respect to torques around the longitudinal axis of the balance shaft and also stiff with regard to bending forces that deviate from the direction of the centrifugal force resulting during the rotation.

In a special embodiment of the invention, the balance shaft has at least one free unsupported end. Preferably, the at least one free end of the balance shaft is formed at least partially by an imbalance weight section.

Because the balance shaft has a free unsupported end that is preferably formed by an imbalance weight section, a bend line of the balance shaft in this end area is not influenced by a bearing. This is possible with the balance shaft according to the invention, because the imbalance weight section opposite the free end with respect to the bearing position is connected by means of a flexible coupling element to the other balance shaft and consequently can likewise bend almost uninfluenced. This allows tilting of the bearing to be avoided despite bending of the free end when the balance shaft rotates. Omitting a bearing position at the free end of the balance shaft, also reduces the generation of friction.

Preferably, the imbalance weight sections and the further shaft sections are designed and arranged such that a center of gravity of the installed balance shaft lies in a center of the multi-cylinder in-line engine relative to its longitudinal direction.

This measure allows the balance shaft to have the minimum possible quasi-static deflection. Therefore the balance shaft has to be only slightly stiffened and can thus be of lighter design. For example, two pairs of imbalance weight sections are deliberately arranged or designed to be slightly asymmetric so that a balance shaft in the quasi-static state runs with the minimum possible deflection.

It is advantageous if the balance shaft has at least two bearing structures, with two first imbalance weight sections being arranged symmetrically with respect to the first bearing structure and two second imbalance weight sections being arranged symmetrically with respect to the second bearing position, with one of the first imbalance weight sections being connected to a drivable end section of the balance shaft and the first imbalance weight sections being of lighter construction than the second imbalance weight sections.

By these measures, with bearing positions arranged symmetrically relative to the center of the engine it is possible to achieve an overall center of gravity of the balance shaft that lies in the center of the engine and central relative to the two bearing positions. Because the first imbalance weight sections, that lie on the end of a drivable end section, are of lighter construction than the second imbalance weight sections, the weight of the drivable end section can be compensated for and the center of gravity remains in the center of the engine or on a transverse axis that passes through the center of the engine. The drivable end section can moreover be supported by means of a further bearing position on the engine.

One of the first imbalance weight sections may be connected by means of a flexible coupling element to the drivable end section.

In this way, a bend line of the balance shaft is influenced as little as possible and, in particular, the balance shaft can deform symmetrically to both sides of the first and second bearing positions, thus ensuring that no tilting or canting of the bearings occurs.

The invention is also applicable to by a multi-cylinder, in-line engine with two balance shafts.

Further features and advantages of the invention will become apparent from the following description of preferred embodiments of the invention with reference to the drawings.

BRIEF DESCRIPTION OF THE DRAWINGS

FIG. 1 shows schematically in a side view a section of a balance shaft according to a first, preferred, embodiment of the invention;

FIG. 2 is schematic representation of the bend line for the rotating balance shaft shown in FIG. 1.

DESCRIPTION OF PREFERRED EMBODIMENT

Figure 3:
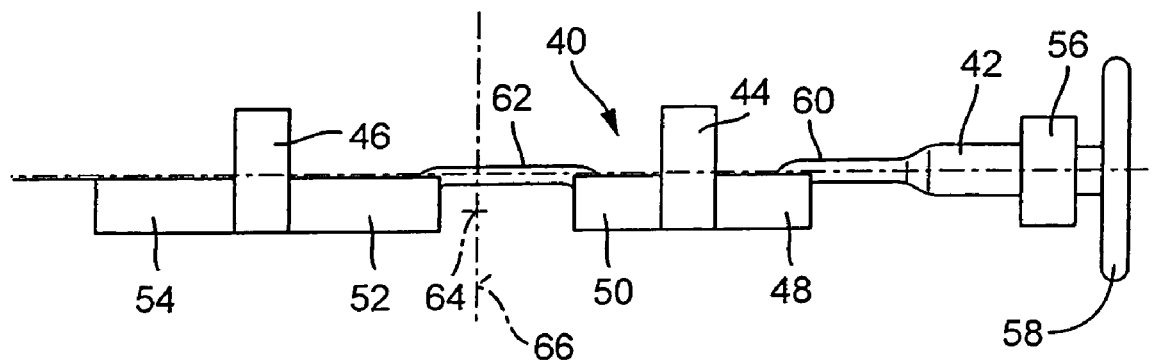
FIG. 3 is schematic side view of a balance shaft according to a second embodiment of the invention.

The balance shaft 10 shown in FIG. 1 is designed for a multi-cylinder, in-line engine and serves to balance second order mass forces. Normally, two balance shafts that counter-rotate at twice the engine speed are arranged offset relative to each other.

The balance shaft 10 is driven by a drive section 12, shown only as a section, with for example a sprocket wheel mounted on its end (not illustrated). The balance shaft 10 is provided with two bearing structures 14 and 16 at which the balance shaft 10 is rotatably supported, for example in an engine block. The bearing structures 14, 16 are cylindrical and have a circumference that is greater than a circumference of the other sections of the balance shaft 10. In this way, the balance shaft 10 can be slid from one end into the bearings of the engine block. A center axis of the balance shaft 10 is indicated by a broken line.

The balance shaft 10 has a total of four imbalance weight sections 18, 20, 22 and 24, with two first imbalance weight sections 18, 20 being arranged symmetrically relative to the first bearing position 14. The second imbalance weight sections 22, 24 are arranged symmetrically relative to the second bearing structure 16. The imbalance weight sections 18, 20, 22, 24 each have a circular cross section viewed in the longitudinal direction of the balance shaft 10 and are arranged in the illustration in FIG. 1 with their total cross section area below the central longitudinal axis of the balance shaft 10. A rotation of the balance shaft 10 thus produces an imbalance resulting in radial centrifugal forces directed outwards. These centrifugal forces directed outwards in each case from the imbalance weight sections 18, 20, 22, 24 are transmitted via the bearing structures 14, 16 to the bearings in the engine block. In the illustration in FIG. 1, a resulting centrifugal force 26 or 28 is shown in each case at the first bearing structure 14 and the second bearing structure 16. It can be seen from this that the illustration in FIG. 1 with forces 26, 28 represents only a snapshot and shows that the centrifugal forces 26, 28 rotate with the balance shaft 10 and therefore always have the same alignment relative to the balance shaft 10.

The drive section 12 and imbalance weight section 18 are connected by means of a flexible coupling element 30 and the imbalance weight section 20 and imbalance weight section 22 are also connected by means of a further flexible coupling element 32. The flexible coupling elements 30, 32 are designed in such a manner that they are comparatively easy to deform by a force extending parallel to the forces 26, 28 and applied at an end of the flexible coupling elements 30, 32 but are comparatively difficult to deform by forces that deviate from the direction of forces 26, 28. Therefore, only a slight bending moment needs to be applied in a direction perpendicular to the plane of the drawing shown in FIG. 1 in order to deform the coupling elements 30, 32. Furthermore, the flexible coupling elements 30, 32 are designed to be almost torsion-proof so that torques, transmitted from the drive section 12, around the central longitudinal axis of the balance shaft 10 are transmitted without significant twisting of the balance shaft 10. The flexible coupling elements 30, 32 have for example a rectangular cross-section, with a short side of the rectangular cross-section being is visible in FIG. 1 and a long side which extends normal to the plane of the drawing.

The schematic illustration in FIG. 2 shows a bend line of the balance shaft 10 that occurs at fast rotation of the shaft. The imbalance caused by the rotation pushes the imbalance weight sections 18, 20, 22 and 24 outwards at their respective end facing away from the assigned bearing position 14, 16 in the direction of the centrifugal forces 26, 28 shown in FIG. 1. The flexible coupling elements 30, 32 counteract such a deflection of the imbalance weight sections 18, 20, 22 and 24 and apply a comparatively slight resistance to such deflection. This can result in the bend line 34, shown as a broken line in FIG. 2.

Starting from the drive section 12, the bend line 34 extends away from the central longitudinal axis to a reversal point 36 located in the area of the first flexible coupling element 30. From point 36, the bend line 34 again runs on the central longitudinal axis and touches the center axis in the center of the first bearing position 14. As it continues, the bend line again departs from the central longitudinal axis to pass through a further reversal point 38 in the area of the flexible coupling element 32. After the reversal point 38, the bend line 34 again approaches the central longitudinal axis and touches it in the center of the second bearing structure 16, in a similar manner as at the first bearing position 14. As it continues further, the bend shaft 34 again departs from the central longitudinal axis, corresponding to the deformation of the free end of the balance shaft 10 during rotation.

As can be seen from FIG. 2, the bend line 34 extends symmetrically in the area of both the first bearing structure 14 and the second bearing structure 16, so that the bearing positions 14, 16 do not tilt even given fast rotation of the balance shaft 10. This is achieved in that the flexible coupling elements 30, 32 only insignificantly hinder a deflection of the imbalance weight sections 18, 20, 22 in the area of their particular ends facing away from the assigned bearing position 14, 16. Furthermore, the imbalance weight section 24 of the balance shaft 10 forms the free end of the balance shaft 10 opposite the drive section 12 and the imbalance weight section 24 can consequently be deflected uninfluenced in the area of its end facing away from the second bearing structure 16.

Consequently, in contrast to the prior art, there is no need for the bearing positions 14, 16 to be spherical, and the load-bearing capacity of the bearing positions 14, 16 can thus be increased. Due to the increased load-bearing capacity, the bearing structures 14, 16, however, can also be of a smaller diameter or smaller width compared with the prior art, so that the balance shaft 10 can be of an overall lighter design.

The schematic illustration in FIG. 3 shows a further embodiment of a balance shaft 40 according to the invention. The balance shaft 40 is similar in design to the balance shaft 10 shown in FIG. 1 and has a drive section 42, a first bearing structure 44, a second bearing structure 46, two first imbalance weight sections 48, 50 and two second imbalance weight sections 52, 54. The first imbalance weight sections 48, 50 are arranged symmetrically with respect to the first bearing structure 44 and the second imbalance weight sections 52, 54 are arranged symmetrically with respect to the second bearing structure 46. The drive section 42 is provided with a bearing position 56 and carries a drive wheel 58 at its free end. The drive section 42 and the imbalance weight section 48 are connected by means of a first flexible coupling element 60 and the first imbalance weight section 50 and second imbalance weight section 52 are connected by means of a second flexible coupling element 62.

In contrast to the balance shaft 10 shown in FIG. 1, the first imbalance weight sections 48, 50 are each of lighter construction than the second imbalance weight sections 52, 54. It is clearly shown in FIG. 3 that the first imbalance weight sections 48, 50 are shorter the direction of a central longitudinal axis of the balance shaft 40 than the second imbalance weight sections 52, 54. The illustration is exaggerated to make this clear. Because the first imbalance weight sections 48, 50 are lighter than the second imbalance weight sections 52, 54, it is possible to obtain an overall center of gravity 64 of the balance shaft 40 that lies exactly in a center of the engine, shown by a broken line 66. The bearing structures 44, 46 are arranged symmetrically with respect to the center of the power train 66, so that the center of gravity 64 lies precisely in the center between the two bearing structures 44, 46. Due to the lighter construction of the imbalance weight sections 48, 50, the weight of the drive section 42 can be compensated for. Because the center of gravity 64 lies precisely in the center between the two bearing positions 44, 46, the balance shaft 10 does not exert a tilting moment (tumbling) on the internal combustion engine, thus again resulting in quieter running of the engine.

Figure 4:
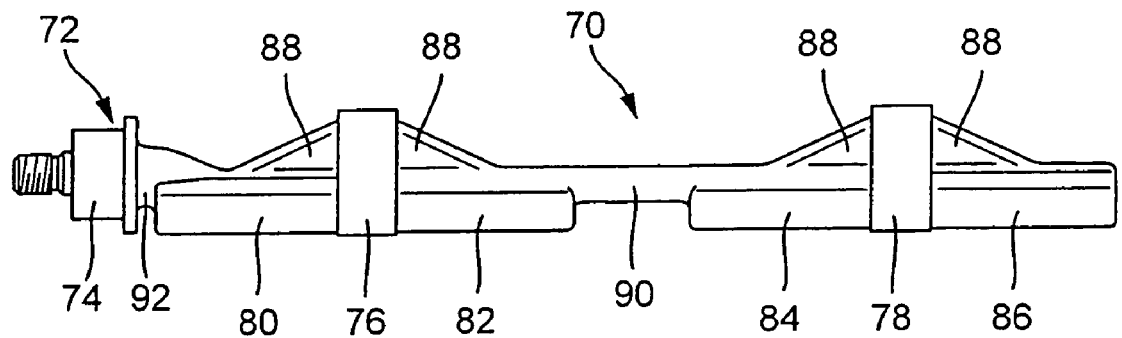
FIG. 4 is a side view of a balance shaft according to a third embodiment of the invention.

FIG. 4 shows a side view of a balance shaft 70 according to a further preferred embodiment of the invention. The balance shaft 70 has a drive section 72 at which a bearing structure 74 is provided. Two further bearing structures 76 and 78 are each flanked by two imbalance weight sections 80, 82, 84 and 86. The imbalance weight section 86 forms the free end of the shaft opposite the drive section 72. The imbalance weight sections 80, 82, 84 and 86 are each connected to a respective bearing position 76, 78 by means of a strut 88. The struts 88 stabilize the balance shaft 70 and are subject to tensile stress during fast rotation of the balance shaft 70. In principle, the struts 88 act against the desired imbalance of the balance shaft 70 due to their dead weight but as can be seen in the perspective view in FIG. 5 the struts 88 are of T-cross section and can therefore be realized at comparatively low weight.

Figure 5:
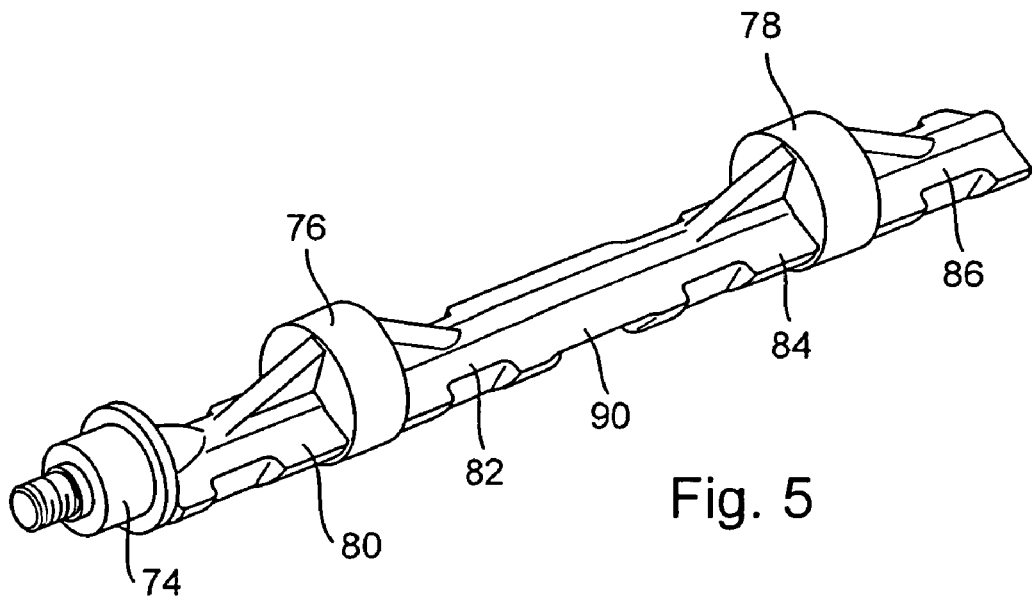
FIG. 5 is a perspective representation of the balance shaft shown in FIG. 4.

The imbalance weight section 82 and the imbalance weight section 84 are connected to each other by means of a flexible coupling element 90 that has a rectangular cross section, as can also be seen in FIG. 5. In the area of the flexible coupling element 90, the balance shaft 70 can thus be bent comparatively easily in the plane of the drawing in FIG. 4, so that only a slight resistance counteracts a deflection of the imbalance weight sections 82, 84 during fast rotation of the shaft. The flexible coupling element 90 is, however, of almost torsion-proof design so that drive moments about the central longitudinal axis of the balance shaft 70 are transmitted without delay and no, or only insignificantly small, torsional oscillations of the balance shaft 70 can develop.

A further flexible coupling element 92 is realized between the drive section 72 and the imbalance weight section 80 by means of a distinct reduction in the cross section of the balance shaft 70. In this case also, a deflection of the end of the imbalance weight section 80 facing away from bearing structure 76 is thus counteracted by only a comparatively small resistance. Because the free end of the balance shaft 70 can also deform unhindered, the same as the free end of the imbalance weight section 86, a bend line, as qualitatively shown in FIG. 2, will be established at fast rotation for the balance shaft 70 in FIGS. 4 and 5

What is claimed is:

1. A balance shaft for a multi-cylinder, in-line engine with at least two imbalance weight sections (18, 20, 22, 24) and at least two bearing structures (14, 16), with said imbalance weight sections (18, 20, 22, 24) being arranged on either side of the bearing structures (14, 16) axially symmetrical thereto and adjacent imbalance weight sections (20, 22) being interconnected between the bearing structures (14, 16) by a radially flexible but rotationally rigid coupling element (32, 90) provided between the adjacent imbalance weight sections (20, 22, 50, 52, 82, 84) so as to permit a certain degree of radial deflection of the ends of the interconnected imbalance weight sections (20, 22, 50, 52, 82, 84) in the direction of the resulting centrifugal forces (26, 28) effective on the imbalance weight sections, the imbalance weight sections (18, 20, 22, 24; 48, 50, 52, 54; 80, 82, 84, 86) arranged on either side of the bearing structures (14, 16; 44, 46; 76, 78) being dimensioned and disposed at such distances from the bearing structures (14, 16; 44, 46; 76, 78) that they are balanced at the bearing structures and essentially no bearing tilting moments occur on the bearing structures (14, 16; 44, 46; 76, 78) during the rotation of the balance shaft.

2. The balance shaft as claimed in claim 1, wherein the flexible coupling element (30, 32; 60, 62; 90, 92) has a rectangular cross-section when viewed in the longitudinal direction of the balance shaft (10; 40; 70), with a smaller side of the rectangular cross section extending parallel to the centrifugal forces (26, 28) effective during rotation of the balance shaft (10; 40; 70).

3. The balance shaft as claimed in claim 1, wherein the balance shaft (10; 40; 70) has at least one free unsupported end.

4. The balance shaft as claimed in claim 3, wherein the at least one free end of the balance shaft (10; 40; 70) is formed at least partially by an imbalance, weight section (24; 54; 86).

5. The balance shaft as claimed in claim 1, wherein a first imbalance weight section (18; 48; 80) is connected to a drivable end section (12; 42; 72) of the balance shaft (10; 40; 70) by means of a first flexible coupling element (30; 60; 92).

6. The balance shaft as claimed in claim 5, wherein the imbalance weight sections (48, 50, 52, 54) and the further shaft sections (42, 60, 62) are designed and arranged such that a center of gravity (64) of the balance shaft (40) lies in a center (66) of the multi-cylinder in-line engine relative to its longitudinal direction when the balance shaft (40) is installed in the multi-cylinder inline engine.

7. The balance shaft as claimed in claim 6, wherein the balance shaft (40) has two bearing structures (44, 46), with two first imbalance weight sections (48, 50) being arranged symmetrically with respect to the first bearing structure (44) and two second imbalance weight sections (52, 54) being arranged symmetrically with respect to the second bearing structure (46), with one of the first imbalance weight sections (48) being connected to a drivable end section (42) of the balance shaft (40) and the first imbalance weight sections (48, 50) being of lighter construction than the second imbalance weight sections (52, 54).

8. The balance shaft as claimed in claim 7, wherein the first imbalance weight sections (48) is connected by means of a flexible coupling clement (60) to the drivable end section (42).

9. A multi-cylinder in-line engine including two balance shafts (10, 40, 70) arranged in parallel spaced relationship, each having at least two imbalance weight sections (18, 20, 22, 24) and at least two bearing structures (14, 16), with said imbalance weight sections (18, 20, 22, 24) being arranged on either side of the bearing structures (14, 16) axially symmetrical thereto and imbalance weight sections (20, 22) being interconnected between the bearing structures (14, 16) by a radially flexible but rotationally rigid coupling element (32, 90) provided between the adjacent imbalance weight sections (20, 22, 50, 52, 82, 84) so as to permit a certain degree of radial deflection of the end of the interconnected imbalance weight section (20, 22, 50, 52, 82, 84) in the direction of the resulting centrifugal forces (26, 28) effective on the imbalance weight sections, the imbalance weight sections (18, 20, 22, 24; 48, 50, 52, 54; 80, 82, 84, 86) arranged on either side of the bearing structures (14, 16; 44, 46; 76, 78) being dimensioned and disposed at such distances from the bearing structures (14, 16; 44, 46; 76, 78) that they are balanced at the bearing structures and essentially no bearing tilting moments occur on the bearing structures (14, 16; 44, 46; 76, 78) during the rotation of the balance shaft.

\* \* \* \* \*